(12) United States Patent
Kitawaki et al.

(10) Patent No.: US 12,716,117 B2
(45) Date of Patent: Aug. 25, 2026

(54) ALUMINUM ALLOY DISC BLANK FOR MAGNETIC DISC AND MAGNETIC DISC

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Wataru Kamagai, Tokyo (JP); Ryo Sakamoto, Tokyo (JP); Hideyuki Hatakeyama, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/334,643

(22) Filed: Jun. 14, 2023

(65) Prior Publication Data

US 2024/0018633 A1 Jan. 18, 2024

Related U.S. Application Data

(63) Continuation of application No. PCT/JP2021/045824, filed on Dec. 13, 2021.

(30) Foreign Application Priority Data

Dec. 15, 2020 (JP) ................................ 2020-207706

(51) Int. Cl.
*C22C 21/08* (2006.01)
*C22C 1/02* (2006.01)
(Continued)

(52) U.S. Cl.
CPC ................ *C22C 21/08* (2013.01); *C22C 1/02* (2013.01); *C22F 1/047* (2013.01);
(Continued)

(58) Field of Classification Search
CPC ... G11B 5/73913; G11B 5/73919; G11B 5/84; G11B 5/8404; C22C 21/00; C22C 21/06
See application file for complete search history.

(56) References Cited

U.S. PATENT DOCUMENTS 4,412,870 A * 11/1983 Vernam .................. C22C 21/06 148/696
4,826,737 A * 5/1989 Yamada ................. C22F 1/047 428/650
(Continued)

FOREIGN PATENT DOCUMENTS

JP H8-83417 A 3/1996
JP H10-8177 A 1/1998
(Continued)

OTHER PUBLICATIONS

Machine English Translation: Saito et al. (JP 2011-253602) (Year: 2011).*
(Continued)

*Primary Examiner* — Holly Rickman
*Assistant Examiner* — Linda N Chau
(74) *Attorney, Agent, or Firm* — Ruggiero McAllister & McMahon LLC

(57) ABSTRACT

An aluminum alloy disc blank for a magnetic disc made of an aluminum alloy containing Mg: 3.40 to 3.90 mass % with the balance being Al and inevitable impurities, wherein a conductivity of the aluminum alloy disc blank is 36.0% IACS or higher.

7 Claims, 2 Drawing Sheets

(51) Int. Cl.

| | |
|---|---|
| ***C22F 1/047*** | (2006.01) |
| ***G11B 5/73*** | (2006.01) |
| ***G11B 5/84*** | (2006.01) |
| ***H01F 1/147*** | (2006.01) |

(52) U.S. Cl.
CPC ............ *G11B 5/73919* (2019.05); *G11B 5/84* (2013.01); *H01F 1/147* (2013.01); *C22C 2202/02* (2013.01)

(56) References Cited

U.S. PATENT DOCUMENTS

| | | | |
|---|---|---|---|
| 5,720,861 A | 2/1998 | Kaneko et al. | |
| 2015/0020930 A1* | 1/2015 | Kamat .................... | C22F 1/002 148/551 |
| 2019/0066724 A1 | 2/2019 | Nakamura et al. | |

FOREIGN PATENT DOCUMENTS

| | | |
|---|---|---|
| JP | H10-110232 A | 4/1998 |
| JP | 2006-260745 A | 9/2006 |
| JP | 2008-238517 A | 10/2008 |
| JP | 2019-56163 A | 4/2019 |
| WO | 2017/188320 A1 | 11/2017 |

OTHER PUBLICATIONS

English Machine Translation: Otsuka et al. (JP 2020-087485).*
English Machine Translation: JPH02-061538.*
International Search Report dated Mar. 1, 2022 from corresponding International Patent Application No. PCT/JP2021/045824, 9 pages.
Written Opinion dated Mar. 1, 2022 from corresponding International Patent Application No. PCT/JP2021/045824, 6 pages.
International Preliminary Report on Patentability dated Jun. 29, 2023 from corresponding International Patent Application No. PCT/JP2021/045824, 9 pages.

* cited by examiner

ALUMINUM ALLOY DISC BLANK FOR MAGNETIC DISC AND MAGNETIC DISC

CROSS REFERENCE TO RELATED APPLICATIONS

The present application is a continuation application of International Patent Application No. PCT/JP2021/045824 filed on Dec. 13, 2021, which claims the benefit of Japanese Patent Application No. 2020-207706, filed on Dec. 15, 2020. The contents of these applications are incorporated herein by reference in their entirety.

BACKGROUND OF THE DISCLOSURE

1. Field of the Disclosure

The present disclosure relates to an aluminum alloy disc blank for a magnetic disc, and to a magnetic disc for which the aluminum alloy disc blank for a magnetic disc is used.

2. Description of the Related Art

A hard disc drive (hereinafter, abbreviated as "HDD") is often used as a storage device in electronic equipment such as computers and video-recording devices. A magnetic disc for recording data is incorporated into the HDD. The magnetic disc contains an aluminum alloy substrate made of an aluminum alloy and having an annular shape, a Ni—P plated layer that covers the surface of the aluminum alloy substrate and a magnetic body layer stacked on the Ni—P plated layer.

In recent years, the amount of information that is recorded in HDDs has been increasing in applications for both industrial uses such as servers or data centers and household uses such as personal computers or video-recording devices. In order to increase the capacity of HDDs in response to such a condition, an increase in the recording density of the magnetic discs that are incorporated into the HDDs is in demand. In order to increase the recording density of a magnetic disc, a smooth Ni—P plated layer is formed on the aluminum alloy substrate.

The magnetic disc is normally produced by the following method. First, a rolled plate of an aluminum alloy is blanked in an annular shape to produce a disc blank. Next, the disc blank is heated while being pressed from both sides in the thickness direction to decrease warpage of the disc blank. After that, cutting and grinding are performed on the disc blank for shaping into a desired shape, whereby an aluminum alloy substrate is obtained. On the aluminum alloy substrate obtained as described above, a pretreatment for forming a Ni—P plated layer, electroless Ni—P plating and the sputtering of a magnetic body layer are sequentially performed, whereby a magnetic disc can be produced.

As the aluminum alloy that is used for the aluminum alloy substrate, a JIS A 5086 alloy is often used.

For magnetic discs, an increase in the capacity and an increase in the density are in demand due to needs from multimedia and the like. For an additional increase in the capacity, there is a tendency of decreasing the floating height of the head during reading and writing; however, when a protruding defect is present on the surface of the magnetic disc, the protruding defect collides with the magnetic head and causes a recording error, and thus reduction of the protruding defect is demanded. In addition, conventionally, high proof stress has been desired for aluminum alloy disc blanks, which enables stable processing and use.

Therefore, for the purpose of further improving smoothness by reducing protruding defects, a technique for reducing a foreign matter in the aluminum alloy substrate, such as an intermetallic compound, is being studied in a variety of manners. For example, in Japanese Patent Application Publication No. H10-008177, a method for reducing a $Mg_2Si$ compound or an Al—Fe-based compound in an aluminum alloy sheet for a magnetic disc substrate containing 2.0 to 6.0 wt % of Mg, 0.05 to 0.15 wt % of Cu, 0.10 to 0.30 wt % of Zn, 0.05 to 0.12 wt % of Zr and 0.2 wt % or less (including 0 wt %) of Sn with the contents of Cu, Zn, Zr and Sn satisfying a relational formula of $0.15\ \text{wt}\ \% \leq 2Cu+6Zr-3Zn-0.1Sn \leq 0.32\ \text{wt}\ \%$ (Cu, Zr, Zn and Sn in the formula are each wt %) and further containing one or two of more than 0.01 wt % and less than 0.05 wt % of Mn and more than 0.01 wt % and less than 0.05 wt % of Cr with the balance being inevitable impurities elements and Al is described.

SUMMARY OF THE DISCLOSURE

Technical Problem

According to the method of Japanese Patent Application Publication No. H10-008177, it is possible to increase the cooling rate during the solidification of molten metal to miniaturize an intermetallic compound by twin roll-type continuous casting. However, in the method of Japanese Patent Application Publication No. H10-008177, there is a problem in that it is difficult to reduce a protruding defect of disc blank attributed to a cause other than the intermetallic compound. In addition, in the method of Japanese Patent Application Publication No. H10-008177, it was difficult to sufficiently improve the proof stress of a disc blank.

The present disclosure has been made in consideration of the above-described problem, and the present inventors found that an aluminum alloy disc blank for a magnetic disc for which smoothness has been enhanced and high proof stress has been attained can be obtained by controlling the Mg amount and conductivity of an aluminum alloy and thereby reducing protruding defects and completed the present disclosure.

DETAILED DESCRIPTION OF THE DISCLOSURE

Solution to Problem

An aspect of the present disclosure is an aluminum alloy disc blank for a magnetic disc made of an aluminum alloy containing Mg: 3.40 to 3.90 mass % with a balance being Al and inevitable impurities, wherein a conductivity of the aluminum alloy disc blank for a magnetic disc is 36.0% IACS or higher.

Another aspect of the present disclosure is the aluminum alloy disc blank for a magnetic disc, wherein the aluminum alloy contains Mg: 3.40 to 3.65 mass %.

Still another aspect of the present disclosure is the aluminum alloy disc blank for a magnetic disc, wherein the aluminum alloy contains Mg: 3.40 to 3.55 mass %.

Far still another aspect of the present disclosure is the aluminum alloy disc blank for a magnetic disc, wherein the aluminum alloy further contains one or two or more elements selected from the group consisting of Cu: 0.30 mass % or less, Zn: 0.60 mass % or less, Fe: 0.60 mass % or less, Si: 0.60 mass % or less, Cr: 0.20 mass % or less, Be: 0.0020 mass % or less, Sr: 0.10 mass % or less, Na: 0.10 mass % or less and P: 0.10 mass % or less.

Still another aspect of the present disclosure is a magnetic disc, including, on a surface of an aluminum alloy substrate made of the aluminum alloy disc blank for a magnetic disc, a Ni—P plated layer and a magnetic body layer on the Ni—P plated layer.

Effects of Disclosure

The aluminum alloy disc blank for a magnetic disc according to the present disclosure is capable of enhancing smoothness and attaining a high proof stress by controlling the Mg amount and the conductivity to reduce protruding defects.

DESCRIPTION OF EMBODIMENTS

Figure 1:
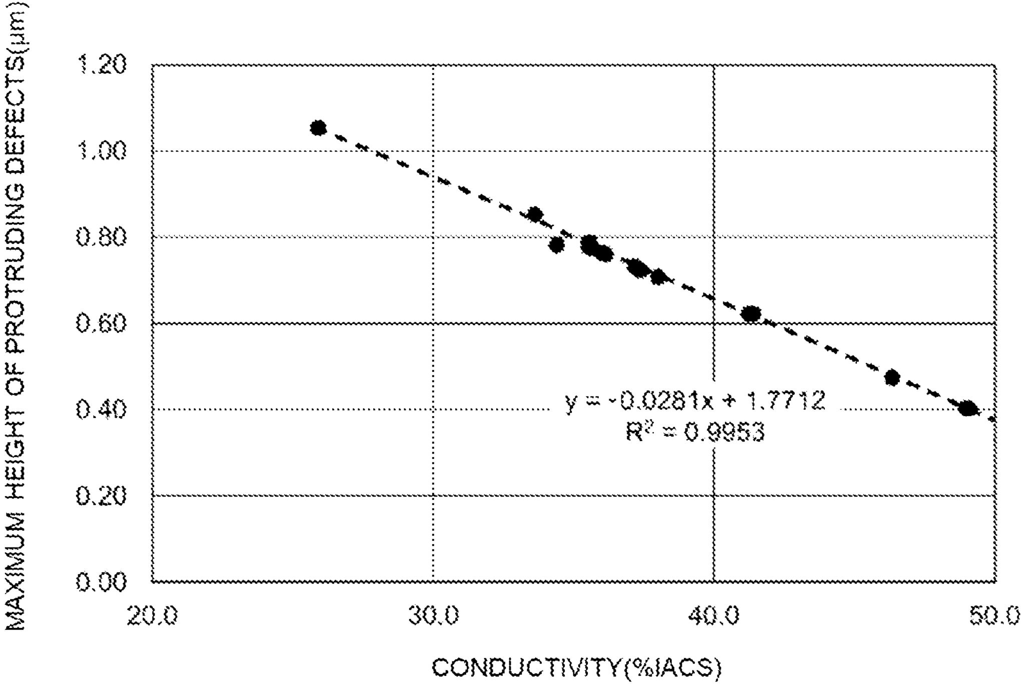
FIG. 1 is a graph showing a relationship between a conductivity of an aluminum alloy disc blank for a magnetic disc and a maximum height of protruding defects.

Aluminum Alloy Disc Blank for Magnetic Disc. An aluminum alloy disc blank for a magnetic disc according to the present disclosure (hereinafter, referred to as "aluminum alloy disc blank" in some cases) will be described. The aluminum alloy disc blank can be obtained by producing an aluminum alloy sheet using an aluminum alloy having a predetermined alloy composition and blanking this in a disc blank shape. The aluminum alloy disc blank is made of an aluminum alloy containing Mg: 3.40 to 3.90 mass % with the balance being Al and inevitable impurities, and has a conductivity of 36.0% IACS or higher. When the conductivity of the aluminum alloy disc blank is 36.0% IACS or higher, it is possible to adjust the amount of a solute atom (particularly Mg) that forms a solid solution in the aluminum alloy to an appropriate range. As a result, it is possible to reduce protruding defects and make the aluminum alloy disc blank excellent in terms of smoothness. In the measurement of the conductivity, it is possible to use, for example, a conductivity meter ("AutoSigma 3000" manufactured by GE Sensing & Inspection Technologies). The measurement of the conductivity is performed on a test material having a thickness of 1 mm or more and 2 mm or less by an eddy current method in an environment of 25° C. In addition, the fact that the content of Mg is 3.40 to 3.90 mass % makes it possible to attain a high proof stress. A reason therefor is that, since Mg is present mainly as a Mg solid solution and exhibits an effect of improving the strength, when the content of Mg is set to 3.40 to 3.90 mass %, the proof stress improves. As a result, it is possible to satisfy both improvement in smoothness and a high proof stress by reduction of protruding defects.

Alloy Composition of Aluminum Alloy. The composition of the aluminum alloy that is used for the aluminum alloy disc blank and reasons for limiting that will be described below in detail.

Mg: 3.40 to 3.90 mass %. Mg is contained in the aluminum alloy as an essential element, is present mainly as a Mg solid solution and exhibits an effect of improving the strength of the aluminum alloy disc blank. In addition, Mg uniformly, thinly and densely attaches a zincate coating during a zincate treatment of the aluminum alloy disc blank and thus, in a plating step that is a subsequent step of a zincate treatment step, improves the smoothness of a plating surface made of Ni—P. However, when the Mg content is less than 3.40 mass % (hereinafter, simply referred to as "%" in some cases), the strength of the aluminum alloy disc blank is insufficient, and the aluminum alloy disc blank deforms during the processing of cutting or grinding or the like. Furthermore, the zincate coating that is generated by the zincate treatment becomes uneven, and the tight contact property or smoothness of plating deteriorates. On the other hand, when the Mg content exceeds 3.90 mass %, residual stress is likely to be generated during the processing of cutting or grinding This is that, when the Mg solid solution amount in the aluminum alloy becomes large, dislocations that are generated during the processing of the aluminum alloy disc blank are fixed, the dislocations do not completely disappear even during annealing that is performed after the processing, the residual stress is released, protruding defects are generated, and the smoothness deteriorates. Therefore, in the aluminum alloy disc blank of the present disclosure, the Mg content of the aluminum alloy is specified to 3.40 to 3.90 mass %. The Mg content is preferably 3.40 to 3.65 mass % and more preferably 3.40 to 3.55 mass % from the viewpoint of the balance between the strength and the manufacturability.

In the aluminum alloy, in addition to Mg, one or two or more elements selected from the group consisting of Cu, Zn, Fe, Si, Be, Cr, Sr, Na and P may be further contained as an additional arbitrary component. In this case, it is possible to obtain an aluminum alloy disc blank for a magnetic disc made of an aluminum alloy containing Mg: 3.40 to 3.90 mass % and containing one or two or more elements selected from the group consisting of Cu: 0.30 mass % or less, Zn: 0.60 mass % or less, Fe: 0.60 mass % or less, Si: 0.60 mass % or less, Cr: 0.20 mass % or less, Be: 0.0020 mass % or less, Sr: 0.10 mass % or less, Na: 0.10 mass % or less and P: 0.10 mass % or less with the balance being Al and inevitable impurities, wherein the conductivity of the aluminum alloy disc blank for a magnetic disc is 36.0% IACS or higher.

Hereinafter, each arbitrary component will be described in detail.

Cu: 0.30 mass % or less. In the aluminum alloy, 0.30 mass % or less of Cu may be contained as an arbitrary component. When the zincate treatment has been performed in the manufacturing process of a magnetic disc, Cu has an action of inhibiting the elution of Al from the aluminum alloy. When the Cu content is set to 0.30 mass % or less, it is possible to attach a dense Zn coating having a thin thickness and a small variation in thickness to the surface of an aluminum alloy substrate at the time of having performed the zincate treatment in the manufacturing process of a magnetic disc. In addition, it is possible to form a smooth Ni—P plated layer by electroless Ni—P plating that is a post step by forming such a Zn coating.

However, when the content of Cu is too large, the corrosion resistance of the aluminum alloy disc blank deteriorates, and a region where Al is likely to be eluted is locally formed. Therefore, when the zincate treatment has been performed in the manufacturing process of a magnetic disc, unevenness is caused in the amount of Al dissolved on the surface of an aluminum alloy substrate, and a variation in the thickness of the Zn coating is likely to become large. As a result, there is a concern that the deterioration of the tight contact property between a Ni—P plated layer and the aluminum alloy substrate or the deterioration of the smoothness of the Ni—P plated layer may result.

When the content of Cu in the aluminum alloy is set to 0.30 mass % or less and preferably set to 0.15 mass % or less, it is possible to inhibit the formation of a plating pit and to further enhance the smoothness of the Ni—P plated layer. The lower limit of the content of Cu is preferably set to 0.0050 mass % and more preferably 0.010 mass %.

Zn: 0.60 mass % or less. In the aluminum alloy, 0.60 mass % or less of Zn may be contained as an arbitrary component. Zn, similar to Cu, has an action of inhibiting the elution of Al from the aluminum alloy during a zincate treatment. When the Zn content is set to 0.60 mass % or less, it is possible to attach a dense Zn coating having a thin thickness and a small variation in thickness to the surface of an aluminum alloy substrate at the time of having performed the zincate treatment in the manufacturing process of a magnetic disc. In addition, it is possible to form a smooth Ni—P plated layer by the electroless Ni—P plating that is a post step by forming such a Zn coating.

However, when the content of Zn is too large, the corrosion resistance of the aluminum alloy disc blank deteriorates, and a region where Al is likely to be eluted is locally formed. Therefore, when the zincate treatment has been performed in the manufacturing process of a magnetic disc, unevenness is caused in the amount of Al dissolved on the surface of an aluminum alloy substrate, and a variation in the thickness of the Zn coating is likely to become large. As a result, there is a concern that the deterioration of the tight contact property between a Ni—P plated layer and the aluminum alloy substrate or the deterioration of the smoothness of the Ni—P plated layer may result.

When the content of Zn in the aluminum alloy is set to 0.60 mass % or less and preferably set to 0.50 mass % or less, it is possible to inhibit the formation of a plating pit and to further enhance the smoothness of the Ni—P plated layer. The lower limit of the content of Zn is preferably set to 0.10 mass % and more preferably 0.25 mass %.

Fe or Si: 0.60 mass % or less. In the aluminum alloy, 0.60 mass % or less of Fe or Si may be contained as an arbitrary component. Fe rarely forms a solid solution in the Al matrix and disperses in the aluminum alloy disc blank as an Al—Fe-based intermetallic compound. Si forms a Mg—Si-based intermetallic compound with Mg in a case where Mg is contained in the aluminum alloy.

In a case where such an Al—Fe-based intermetallic compound or Mg—Si-based intermetallic compound has dropped from the surface of the aluminum alloy disc blank, in the electroless Ni—P plating that is a post step, a plating pit is likely to be formed. When the contents of Fe and Si in the aluminum alloy are each set to 0.60 mass % or less, preferably set to 0.050 mass % or less and more preferably set to 0.0010 mass % or less, it is possible to further reduce the amount of the above-described intermetallic compound that is present in the aluminum alloy disc blank. As a result, it is possible to inhibit the formation of a plating pit and to further enhance the smoothness of the Ni—P plated layer.

In order to inhibit the generation of a plating pit by the above-described intermetallic compounds, it is preferable to decrease the contents of Fe and Si. However, these elements are contained not only in ingots having an ordinary purity but also in high-purity ingots having a purity of Al of 99.9 mass % or higher. Therefore, when an attempt is made to produce an aluminum alloy disc blank rarely containing Fe and Si, there is a need to perform a special treatment for removing these elements during casting, which leads to an increase in the manufacturing cost of the aluminum alloy disc blank.

When the contents of Fe and Si in the aluminum alloy are each 0.0010 mass % or less, it is possible to produce an aluminum alloy disc blank without performing the special treatment for removing these elements. As a result, it is possible to further enhance the smoothness while avoiding an increase in the manufacturing cost of the aluminum alloy disc blank. In addition, when the contents of Fe and Si in the aluminum alloy are each more than 0.0010 mass % but 0.60 mass % or less, it is possible to produce an aluminum alloy disc blank using an ingot having a lower purity. Therefore, it is possible to further reduce the material cost of the aluminum alloy disc blank.

Be: 0.0020 mass % or less. Be is an element that is added to molten metal for the purpose of inhibiting the oxidation of Mg at the time of casting an aluminum alloy containing Mg. In addition, when Be that is contained in the aluminum alloy is set to 0.0020 mass % or less, it is possible to make a Zn coating that is formed on the surface of the aluminum alloy substrate in the manufacturing process of a magnetic disc denser and to further decrease the variation in the thickness. As a result, it is possible to further enhance the smoothness of a Ni—P plated layer that is formed on the aluminum alloy substrate.

However, when the Be content in the aluminum alloy is excessively large, a Be-based oxide is likely to be formed on the surface of the aluminum alloy disc blank when the aluminum alloy disc blank has been heated in the manufacturing process of the aluminum alloy disc blank. In addition, in a case where the aluminum alloy further contains Mg, an Al—Mg—Be-based oxide is likely to be formed on the surface of the aluminum alloy disc blank when the aluminum alloy disc blank has been heated. When the amount of these oxides becomes large, the variation in the thickness of the Zn coating becomes large, and there is a concern that the generation of a plating pit may result.

When the Be content in the aluminum alloy is set to 0.0020 mass % or less and preferably set to 0.0010 mass % or less, it is possible to reduce the amount of an Al—Mg—Be-based oxide and to further enhance the smoothness of the Ni—P plated layer. The lower limit value of the Be content may be 0 mass % (0.0000 mass %), but is preferably set to 0.0002 mass %.

Cr: 0.20 mass % or less. In the aluminum alloy, 0.20 mass % or less of Cr may be contained as an arbitrary component. Some of Cr disperses in the aluminum alloy disc blank as a fine intermetallic compound that is generated during casting. Cr that has not formed an intermetallic compound during casting forms a solid solution in the Al matrix and has an action of improving the strength of the aluminum alloy disc blank by solid solution strengthening.

In addition, Cr has an action of further enhancing the cutting property and the grinding property and further refining the recrystallized structure. As a result, the tight contact property between the aluminum alloy substrate and the Ni—P plated layer is further enhanced, and the generation of a plating pit is inhibited.

However, when the content of Cr in the aluminum alloy is excessively large, a coarse Al—Cr-based intermetallic compound is likely to be formed in the aluminum alloy substrate. In a case where such a coarse Al—Cr-based intermetallic compound has dropped from the surface of the aluminum alloy substrate, in the electroless Ni—P plating that is a post step, a plating pit is likely to be formed.

When the content of Cr in the aluminum alloy is set to 0.20 mass % or less and preferably set to 0.10 mass % or less, it is possible to inhibit the formation of a plating pit, to form a smooth Ni—P plated layer and to further improve the strength of the aluminum alloy substrate. The lower limit value of the content of Cr is preferably set to 0.030 mass % and more preferably 0.050 mass %.

Sr, Na and P: 0.10 mass % or less each. Sr, Na and P refine second phase particles (mainly Si particles) in the aluminum alloy disc blank and exhibit an effect of improving the plating property. In addition, Sr, Na and P also exhibit an effect of decreasing the unevenness in the sizes of the second phase particles in the aluminum alloy disc blank and reducing the variation in the impact resistance. Therefore, 0.10 mass % or less of each of Sr, Na and P may be contained in the aluminum alloy.

However, even when more than 0.10 mass % of each of Sr, Na and P is contained, the above-described effects are saturated, and an additional significant effect cannot be obtained. In addition, in order to obtain the above-described effect, it is preferable to set the lower limit value of each of Sr, Na and P to 0.0010 mass %.

Other elements. In the aluminum alloy, elements that become inevitable impurities other than the above-described essential component and arbitrary components may be contained. Examples of these elements include Mn, Zr, Ti, B, Si, Ga and the like, and, as long as the content of each element is 0.10 mass % or less and the total content is 0.30 mass % or less, the action effect of the present disclosure is not impaired. As described above, in the present disclosure, it is also possible to actively add Si as an arbitrary component, but there are also cases where Si is not actively added and becomes an inevitable impurity. Si is contained as an inevitable impurity not only in ingots having an ordinary purity but also in high-purity ingots having a purity of Al of 99.9 mass % or higher, and, in the case of being contained as an inevitable impurity as described above, when the content thereof is 0.10 mass % or less, effects of the present disclosure are not impaired. In the case of actively adding Si as an arbitrary component, the content of Si in the aluminum alloy is preferably 0.60 mass % or less from the viewpoint of reducing the intermetallic compound amount as described above.

Conductivity of Aluminum Alloy Disc Blank: 36.0% IACS or Higher. As the value of the conductivity of the aluminum alloy disc blank becomes larger, it is indicated that the amount of the solute atom that forms a solid solution in the aluminum alloy becomes smaller. When the conductivity of the aluminum alloy disc blank is set within the above-described specific range (36.0% IACS or higher), it is possible to adjust the amount of the solute atom (particularly Mg) that forms a solid solution in the aluminum alloy to an appropriate range. As a result, it is possible to reduce protruding defects and make the aluminum alloy disc blank excellent in terms of smoothness.

In a case where the conductivity is lower than 36.0% IACS, since the amount of the solute atom that forms a solid solution in the aluminum alloy becomes large, there is a concern that a large number of protruding defects may be generated. This is that, when the Mg solid solution amount in the aluminum alloy becomes large, dislocations that are generated during the processing are fixed, the dislocations do not completely disappear even during annealing that is performed after the processing, the residual stress is released, protruding defects are generated, and the smoothness deteriorates. Therefore, the conductivity of the aluminum alloy disc blank of the present disclosure is specified to 36.0% IACS or higher. The conductivity is preferably 37.0% IACS or higher and more preferably 38.0% IACS or higher. In the aluminum alloy including chemical components within the above-described specific ranges, normally, the upper limit of the conductivity is approximately 45.0% IACS. FIG. 1 is a graph showing the relationship between the conductivity of the aluminum alloy disc blank and the maximum height of protruding defects. The details of the aluminum alloy disc blank shown in FIG. 1 will be described in examples below. As shown in FIG. 1, it is found that, when the conductivity becomes large, the maximum height of the protruding defects becomes small. The evaluation of the protruding defects is performed by pressing a micro-Vickers indentation on the surface of the aluminum alloy disc blank under a condition of 5 kg, then, cutting the surface with a lathe until the indentation disappears, performing annealing at 270° C. for one hour and measuring the maximum height of protruding defects generated in a place where the indentation has been present.

Method for Manufacturing Aluminum Alloy Sheet.

(1) Casting Step. A raw material of an aluminum material having a predetermined alloy composition is melted, molten metal is produced, and then this is cast, thereby producing an ingot. As the casting, a semi-continuous casting (DC casting) method, a mold casting method or a continuous casting (CC casting) method is used. In the DC casting method, the molten metal poured through a spout is robbed of heat with a bottom block, the wall of a mold cooled with water, and cooling water that is directly discharged to the outer periphery of an ingot, solidified and drawn downward as an ingot. In the mold casting method, the molten metal poured into a hollow mold made of cast iron or the like is robbed of heat into the wall of the mold and solidified, whereby an ingot is completed. In the CC casting method, the molten metal is supplied to a portion between a pair of rolls (or belt casters, block casters) through a casting nozzle, and a thin sheet is directly cast by removing heat from the rolls.

In such a casting step, it is preferably to perform inline a degassing treatment for reducing dissolved gas in the molten metal and a filtration treatment for removing a solid matter from the molten metal.

As the degassing treatment, it is possible to adopt, for example, a treatment method that is called an SNIF (spinning nozzle inert flotation) process, a treatment method that is called an Alpur process or the like. In these processes, a process gas such as argon gas or a gas mixture of argon and chlorine is blown while the molten metal is stirred at a high speed with a blade-attached rotary body, and fine bubbles of the process gas are formed in the molten metal. This makes it possible to remove hydrogen gas or an inclusion dissolved in the molten metal within a short period of time. In the degassing treatment, it is possible to use an inline-type degassing device.

As the filtration treatment, it is possible to adopt, for example, a cake filtration-type treatment, a filter medium filtration-type treatment or the like. In addition, in the filtration treatment, it is possible to use, for example, filters such as a ceramic tube filter, a ceramic foam filter and an alumina ball filter.

(2) Homogenization Treatment Step. Until hot rolling is performed after the ingot is produced, a homogenization treatment may be performed by performing the facing of the ingot as necessary. It is possible to set the holding temperature in the homogenization treatment as appropriate in, for example, a range of 500° C. to 570° C. In addition, it is possible to set the holding time in the homogenization treatment as appropriate in, for example, a range of one to 60 hours.

(3) Hot Rolling Step. Thereafter, hot rolling is performed on the ingot, thereby producing a hot rolled sheet. The rolling conditions of the hot rolling are not particularly limited, and it is possible to perform the hot rolling by, for example, setting the start temperature in a range of 400° C. to 550° C. and the end temperature in a range of 260° C. to 380° C.

(4) Cold Rolling Step. After the hot rolling is performed, it is possible to obtain a cold rolled sheet by performing one pass or more of cold rolling on the obtained hot rolled sheet. The rolling conditions of the cold rolling are not particularly limited and may be set as appropriate depending on the desired thickness and strength of the aluminum alloy disc blank. For example, the total rolling reduction in the cold rolling can be set to 20% to 95%. In addition, it is possible to set the thickness of the cold rolled sheet as appropriate in, for example, a range of 0.2 to 1.9 mm.

(5) Annealing Step. In the manufacturing method of the above-described aspect, an annealing treatment may be performed as necessary at least one of before the first pass and between passes in the cold rolling. The annealing treatment may be performed using a batch-type heat treatment furnace or may be performed using a continuous heat treatment furnace. In the case of using the batch-type heat treatment furnace, it is preferable to set the holding temperature during annealing to 250° C. to 430° C. and the holding time in a range of 0.1 to 10 hours. In addition, in the case of using the continuous heat treatment furnace, it is preferable to set the retention time in the furnace to 60 seconds or shorter and the temperature in the furnace to 400° C. to 500° C. When the annealing treatment is performed under such conditions, it is possible to recover the processability during the cold rolling.

The aluminum alloy sheet is produced by the above-described steps.

Method for Manufacturing Aluminum Alloy Substrate.

Upon producing the aluminum alloy substrate from the aluminum alloy sheet, it is possible to adopt, for example, the following method. First, blanking is performed on the above-described aluminum alloy sheet, thereby producing an aluminum alloy disc blank having an annular shape. After that, the aluminum alloy disc blank is heated while being pressed from both sides in the thickness direction to perform press annealing, whereby strain in the aluminum alloy disc blank is reduced, and the flatness is improved. The holding temperature and pressure in the press annealing can be selected as appropriate from, for example, 250° C. to 430° C. and a range of 1.0 to 3.0 MPa. In addition, the holding time in the press annealing can be set to, for example, 30 minutes or longer.

Figure 2:
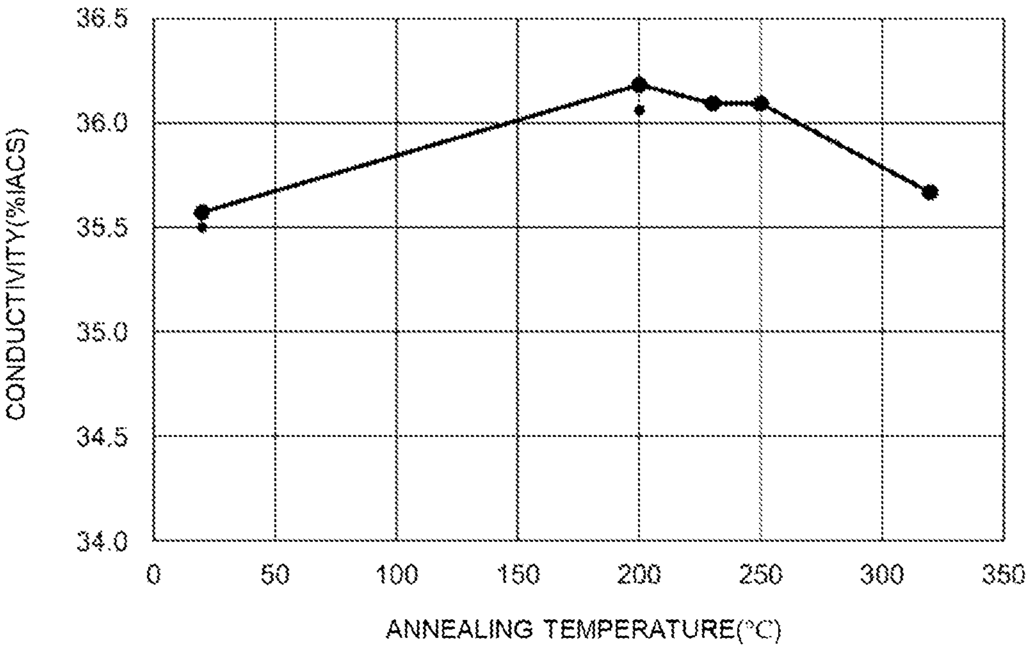
FIG. 2 is graph showing a relationship between an annealing temperature after press annealing and the conductivity of the aluminum alloy disc blank for a magnetic disc.

It is preferable to perform annealing after the press annealing is performed and before cutting and grinding. It is preferable to set the holding temperature during the annealing to 190° C. to 260° C. and the holding time within a range of 0.1 to 10 hours. In addition, the holding temperature during the annealing is more preferably 190° C. to 240° C. and still more preferably 190° C. to 220° C. The holding time during the annealing is more preferably 0.5 to 10 hours and still more preferably one to 10 hours. When the annealing treatment is performed under such conditions, it is possible to increase the conductivity. This is because mainly a Mg solid solution precipitates, which makes it possible to reduce residual stress during processing. FIG. 2 is a graph showing the relationship between the annealing temperature after the press annealing and the conductivity of the aluminum alloy disc blank. The details of the aluminum alloy disc blank shown in FIG. 2 will be described in examples below. As shown in FIG. 2, it is found that, when annealing is performed at approximately 190° C. to 260° C., the conductivity increases.

After the annealing is performed, cutting and grinding are sequentially performed on the aluminum alloy disc blank, whereby an aluminum alloy substrate having a desired shape is produced. After these processes are performed, a strain relief heat treatment that removes strain during processing may be performed under conditions of at 150° C. to 350° C. for 0.1 to 10.0 hours as necessary.

The aluminum alloy substrate is produced by the above-described steps.

Magnetic Disc

Configuration of Magnetic Disc. A magnetic disc including the aluminum alloy substrate has, for example, the following configuration. That is, the magnetic disc includes the aluminum alloy substrate, a Ni—P plated layer that covers the surface of this aluminum alloy substrate and a magnetic body layer stacked on this Ni—P plated layer. The Ni—P plated layer is preferably an electroless Ni—P plated layer formed by electroless plating.

The magnetic disc may further include a protective layer made of a carbon-based material such as diamond-like carbon and stacked on the magnetic body layer, and a lubricating layer made of a lubricant and applied on the protective layer.

Method for Manufacturing Magnetic Disc

Upon manufacturing the magnetic disc from the aluminum alloy substrate, it is possible to adopt, for example, the following method. First, degreasing cleaning is performed on the aluminum alloy substrate to remove an oil component such as processing oil attached to the surface of the aluminum alloy substrate. After the degreasing cleaning, etching may be performed on the aluminum alloy substrate using an acid as necessary. In a case where etching has been performed, it is preferable to perform a desmutting treatment for removing smut generated by the etching from the aluminum alloy substrate after the etching. Treatment conditions in these treatments can be set as appropriate depending on the kind of a treatment liquid.

After these plating pretreatments are performed, a zincate treatment for forming a Zn coating on the surface of the aluminum alloy substrate is performed. In the zincate treatment, it is possible to form a Zn coating by performing zinc immersion plating by which Al is substituted by Zn. As the zincate treatment, it is preferable to adopt a so-called double zincate method in which, after first zinc immersion plating is performed, a Zn coating formed on the surface of the aluminum alloy substrate is once peeled off and zinc immersion plating is performed again to form a Zn coating. According to the double zincate method, compared with a Zn coating that is formed by first zinc immersion plating alone, it is possible to form a denser Zn coating on the surface of the aluminum alloy substrate. As a result, it is possible to reduce a defect of the Ni—P plated layer in the electroless Ni—P plating that is a post step.

After the Zn coating is formed on the surface of the aluminum alloy substrate by the zincate treatment, it is possible to substitute the Zn coating by a Ni—P plated layer by performing electroless Ni—P plating. When it is possible to decrease coarse Si—K—O-based particles or Ti—B-based particles on the aluminum alloy substrate surface as described above, a dense Zn coating having a thin thickness and a small variation in thickness is formed on the surface of the aluminum alloy substrate after the zincate treatment. In addition, it is possible to form a smooth Ni—P plated layer having a small number of plating pits by substituting such a Zn coating by a Ni—P plated layer in the electroless Ni—P plating.

When the thickness of the Ni—P plated layer is made to be thick, there is a tendency that the number of plating pits becomes small, and it is possible to form a smooth Ni—P plated layer. Therefore, the plating thickness is preferably 7 m or more, more preferably 18 m or more and still more preferably 25 m or more. Practically, the upper limit value of the plating thickness is approximately 40 m.

It is possible to further enhance the smoothness of the surface of the Ni—P plated layer by polishing the Ni—P plated layer after the electroless Ni—P plating.

After the electroless Ni—P plating (also including the polishing treatment), a magnetic body is attached onto the Ni—P plated layer by sputtering to form a magnetic body layer. The magnetic body layer may be formed of a single layer or may be formed of a plurality of layers having different compositions from each other. After the sputtering is performed, a protective layer made of a carbon-based material is formed on the magnetic body layer by CVD. Next, a lubricant is applied onto the protective layer to form a lubricating layer. It is possible to obtain the magnetic disc as described above.

Examples

Examples of an aluminum alloy sheet, a method for manufacturing the same and an aluminum alloy disc blank that is produced from this aluminum alloy sheet will be described.

A specific aspect of the aluminum alloy sheet, the method for manufacturing the same, the aluminum alloy disc blank that is produced from this aluminum alloy sheet and the method for manufacturing the same is not limited to aspects of the examples to be described below, and it is possible to modify the configuration as appropriate from the examples to an extent that the gist of the present disclosure is not impaired.

(1) Production of Aluminum Alloy Sheet

Aluminum alloy sheets that were used for evaluation in the present examples were produced by the following method. First, molten metal including chemical components shown in Table 1 was prepared in a melting furnace.

TABLE 1

| | Alloy | Alloy composition (mass %) | | | | | | | | |
|---|---|---|---|---|---|---|---|---|---|---|
| | No. | Si | Fe | Cu | Mn | Mg | Cr | Zn | Be | Al + Inevitable impurity |
| Example 1 | A1 | 0.016 | 0.026 | 0.000 | 0.00 | 3.89 | 0.00 | 0.00 | 0.0003 | Balance |
| Example 2 | A2 | 0.016 | 0.026 | 0.000 | 0.00 | 3.89 | 0.00 | 0.00 | 0.0003 | Balance |
| Example 3 | A3 | 0.016 | 0.026 | 0.000 | 0.00 | 3.89 | 0.00 | 0.00 | 0.0003 | Balance |
| Example 4 | A4 | 0.025 | 0.020 | 0.030 | 0.00 | 3.50 | 0.05 | 0.30 | 0.0000 | Balance |
| Example 5 | A5 | 0.025 | 0.020 | 0.030 | 0.00 | 3.75 | 0.05 | 0.30 | 0.0000 | Balance |
| Example 6 | A6 | 0.025 | 0.020 | 0.030 | 0.00 | 3.60 | 0.05 | 0.30 | 0.0000 | Balance |
| Comparative Example 1 | B1 | 0.020 | 0.020 | 0.014 | 0.00 | 3.80 | 0.05 | 0.32 | 0.0003 | Balance |
| Comparative Example 2 | B2 | 0.026 | 0.022 | 0.004 | 0.00 | 0.0 | 0.00 | 0.0002 | 0.0000 | Balance |
| Comparative Example 3 | B3 | 0.021 | 0.023 | 0.006 | 0.00 | 2.0 | 0.00 | 0.00 | 0.0002 | Balance |
| Comparative Example 4 | B4 | 0.016 | 0.026 | 0.000 | 0.00 | 3.89 | 0.00 | 0.00 | 0.0003 | Balance |
| Comparative Example 5 | B5 | 0.025 | 0.020 | 0.03 | 0.00 | 2.00 | 0.05 | 0.30 | 0.0000 | Balance |
| Comparative Example 6 | B6 | 0.025 | 0.020 | 0.030 | 0.00 | 3.00 | 0.05 | 0.30 | 0.0000 | Balance |
| Comparative Example 7 | B7 | 0.025 | 0.020 | 0.030 | 0.00 | 4.0 | 0.05 | 0.30 | 0.0000 | Balance |
| Comparative Example 8 | B8 | 0.025 | 0.020 | 0.030 | 0.00 | 5.0 | 0.05 | 0.30 | 0.0000 | Balance |
| Comparative Example 9 | B9 | 0.016 | 0.026 | 0.000 | 0.00 | 3.89 | 0.00 | 0.00 | 0.0003 | Balance |

Thereafter, the molten metal in the melting furnace was moved, and an ingot was produced by a casting method shown in Table 2. Next, the surface of the ingot was faced, and a segregation layer present on the ingot surface was removed. A homogenization treatment was performed by performing a heating treatment on the ingot on which the facing has been performed under conditions shown in Table 2. Hot rolling was performed to obtain a hot rolled sheet. Furthermore, cold rolling was performed under conditions shown in Table 2 to obtain a cold rolled steel sheet.

(2) Production of Aluminum Alloy Disc Blank

Blanking was performed on the aluminum alloy sheet, thereby obtaining an aluminum alloy disc blank having an annular shape with an outer diameter of 98 mm and an inner diameter of 24 mm. Here, next, the obtained aluminum alloy disc blank was held at a temperature shown in Table 2 for three hours while being pressed from both sides in the thickness direction to perform press annealing. After that, annealing was performed by holding the aluminum alloy disc blank at a temperature shown in Table 2 for three hours. A reference sign "-" in Table 2 indicates that the annealing was not performed. A test material of the aluminum alloy disc blank was produced as described above.

Measurement of Conductivity

The conductivity (% IACS) of the test material was measured using the aluminum alloy disc blank or the annealed aluminum alloy disc blank by an eddy current method using a conductivity meter ("AutoSigma 3000" manufactured by GE Sensing & Inspection Technologies). The measurement of the conductivity was performed in an environment of 25° C. In addition, in a case where the sheet thickness was less than 1 mm, two or more blanks were stacked so that the thickness reached 1 mm or more and 2 mm or less, and the measurement was performed.

Measurement of Maximum Height of Protruding Defects

The aluminum alloy disc blank or the annealed aluminum alloy disc blank was used, a micro-Vickers indentation was pressed on the surface under a condition of 5 kg, then, the surface was cut with a lathe until the indentation disappeared, annealing was performed at 270° C. for one hour and the maximum height of protruding defects generated in a place where the indentation has been present was measured. The measurement of the maximum height was performed with a flatness measuring instrument (MESA) manufactured by ZyGO Corporation. The maximum height in the present disclosure is represented by the difference between the maximum crest height and the maximum trough depth in a region surrounded by a circle having a radius of 5 mm from the central part of the indentation before cutting on the surface of the aluminum alloy disc blank. Here, the maximum crest height is the difference between the average line of the contour line in the measurement range and the highest value in the measurement range, and the maximum trough depth is the difference between the average line and the lowest value in the measurement range. Regarding the evaluation of the maximum height of protruding defects, a case where the maximum height of protruding defects was 0.750 m or less was regarded as A (excellent), more than 0.750 m and 0.760 m or less was regarded as B (favorable), and more than 0.760 m was regarded as C (poor).

Measurement of Proof Stress

The proof stress was measured according to JIS Z 2241 with n=1 by performing annealing (press annealing-simulated heating) on the aluminum alloy disc blank after the cold rolling at 320° C. for three hours and then collecting a JIS No. 5 test piece along the rolling direction. Regarding the evaluation of the strength, a case where the proof stress was 90 MPa or higher was regarded as A (excellent), and lower than 90 MPa was regarded as C (poor).

The results are shown in Table 2.

TABLE 2

| | Alloy No. | Casting method | Homogenization treatment temperature (° C.) | Homogenization treatment time (h) | Hot rolling start temperature (° C.) | Hot rolling end temperature (° C.) | Sheet thickness after hot rolling (mm) | Total rolling reduction of cold rolling (%) |
|---|---|---|---|---|---|---|---|---|
| Example 1 | A1 | Mold casting | 540 | 4 | 540 | 280 | 3 | 75 |
| Example 2 | A2 | Mold casting | 540 | 4 | 540 | 280 | 3 | 75 |
| Example 3 | A3 | Mold casting | 540 | 4 | 540 | 280 | 3 | 75 |
| Example 4 | A4 | Mold casting | 540 | 6 | 540 | 280 | 5 | 83 |
| Example 5 | A5 | Mold casting | 540 | 6 | 540 | 280 | 5 | 83 |
| Example 6 | A6 | Mold casting | 540 | 6 | 540 | 280 | 5 | 83 |
| Comparative Example 1 | B1 | DC casting | 550 | 4 | 450 | 350 | 3.8 | 66 |
| Comparative Example 2 | B2 | Mold casting | 540 | 4 | 540 | 280 | 3 | 75 |
| Comparative Example 3 | B3 | Mold casting | 540 | 4 | 540 | 280 | 3 | 75 |
| Comparative Example 4 | B4 | Mold casting | 540 | 4 | 540 | 280 | 3 | 75 |
| Comparative Example 5 | B5 | Mold casting | 540 | 6 | 540 | 280 | 5 | 83 |
| Comparative Example 6 | B6 | Mold casting | 540 | 6 | 540 | 280 | 5 | 83 |
| Comparative Example 7 | B7 | Mold casting | 540 | 6 | 540 | 280 | 5 | 83 |
| Comparative Example 8 | B8 | Mold casting | 540 | 6 | 540 | 280 | 5 | 83 |
| Comparative Example 9 | B9 | DC casting | 540 | 4 | 540 | 280 | 3 | 75 |

| | Sheet thickness after cold rolling (mm) | Press annealing temperature (° C.) | Annealing temperature after press annealing (° C.) | Conductivity (% IACS) | Proof stress (MPa) | Evaluation of proof stress | Maximum height of protruding defects (μm) | Evaluation of maximum height of protruding defects |
|---|---|---|---|---|---|---|---|---|
| Example 1 | 0.74 | 320 | 200 | 36.2 | 103.1 | A | 0.755 | B |
| Example 2 | 0.74 | 320 | 230 | 36.1 | 103.1 | A | 0.757 | B |
| Example 3 | 0.74 | 320 | 250 | 36.1 | 103.1 | A | 0.757 | B |
| Example 4 | 0.826 | 330 | 200 | 38.0 | 94.7 | A | 0.704 | A |
| Example 5 | 0.826 | 330 | 200 | 36.1 | 100.1 | A | 0.758 | B |
| Example 6 | 0.826 | 330 | 200 | 37.2 | 96.9 | A | 0.726 | A |
| Comparative Example 1 | 1.3 | 320 | — | 35.5 | 101.2 | A | 0.774 | C |
| Comparative Example 2 | 0.74 | 320 | — | 65.4 | 19.0 | C | 0.000 | A |
| Comparative Example 3 | 0.74 | 320 | — | 46.3 | 62.7 | C | 0.470 | A |
| Comparative Example 4 | 0.74 | 320 | — | 35.6 | 103.4 | A | 0.785 | C |
| Comparative Example 5 | 0.826 | 330 | — | 49.1 | 62.2 | C | 0.400 | A |
| Comparative Example 6 | 0.826 | 330 | — | 41.3 | 83.9 | C | 0.620 | A |

TABLE 2-continued

| | | | | | | | | |
|---|---|---|---|---|---|---|---|---|
| Comparative Example 7 | 0.826 | 330 | — | 33.6 | 105.6 | A | 0.850 | C |
| Comparative Example 8 | 0.826 | 330 | — | 25.9 | 127.3 | A | 1.050 | C |
| Comparative Example 9 | 0.74 | 320 | 320 | 35.7 | 103.1 | A | 0.769 | C |

As shown in Tables 1 and 2, in Examples 1 to 6, the aluminum alloy disc blanks had a specific alloy composition specified in claims, and the conductivity thereof was 36.0% IACS or higher. Therefore, in these examples, the formation of protruding defects was inhibited, and it was possible to enhance the smoothness and obtain a high proof stress of 90 MPa or higher.

In contrast, in Comparative Examples 1 to 9, since any of the alloy composition or the conductivity deviated from the scope of the claims, protruding defects were formed, and the smoothness was low or the proof stress was low.

FIGS. 1 to 4 are views showing the results of part or all of the examples in graphs. In FIGS. 1 to 4, results that are not from the examples are also partially shown in the graphs. More specifically, FIG. 1 is a graph showing the relationship between the conductivity of the aluminum alloy disc blank and the maximum height of protruding defects, and it is found that, in the range of data shown in the graph, a relational expression "“maximum height of protruding defects”=−0.0281×“conductivity”+1.7712" is satisfied. As a result, it is found from FIG. 1 that, when the conductivity becomes large, the maximum height of protruding defects decreases.

FIG. 2 is a graph showing the relationship between the annealing temperature after the press annealing and the conductivity of the aluminum alloy disc blank, and it is found that the conductivity is 36.0% IACS or higher from the fact that the annealing temperature after the press annealing is within a range of 190° C. to 260° C.

Figure 3:
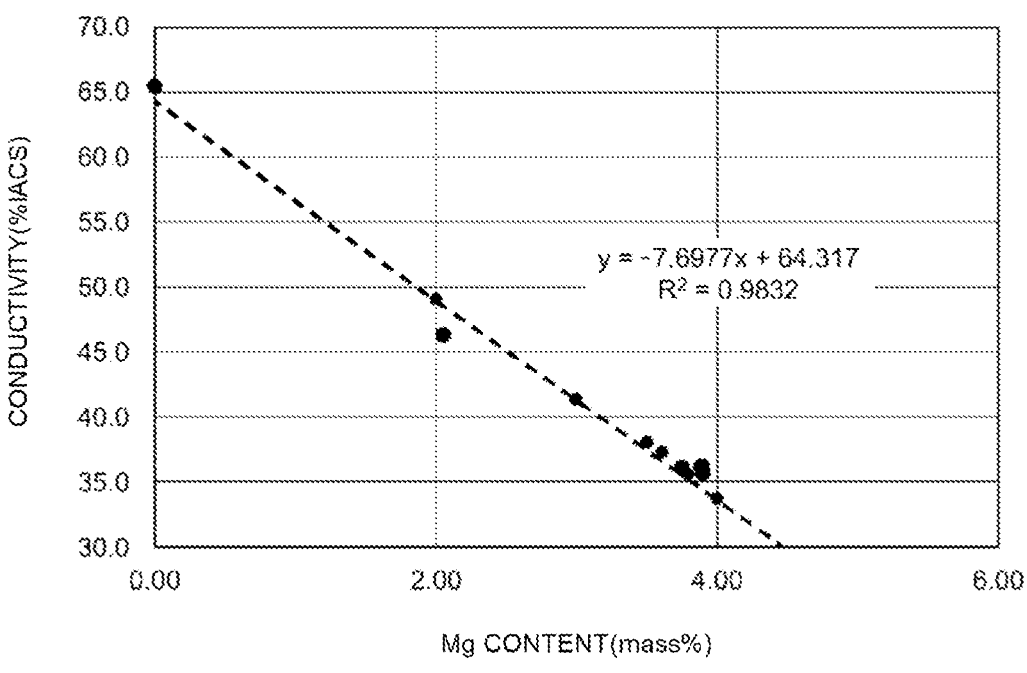
FIG. 3 is a graph showing a relationship between a Mg content and the conductivity of the aluminum alloy disc blank for a magnetic disc.

FIG. 3 is a graph showing the relationship between the Mg content and the conductivity of the aluminum alloy disc blank, and it is found that, in the range of data shown in the graph, a relational expression "“conductivity”=−7.6977×“Mg content”+64.317" is satisfied. As a result, it is found from FIG. 3 that, when the Mg content becomes large, the conductivity decreases.

Figure 4:
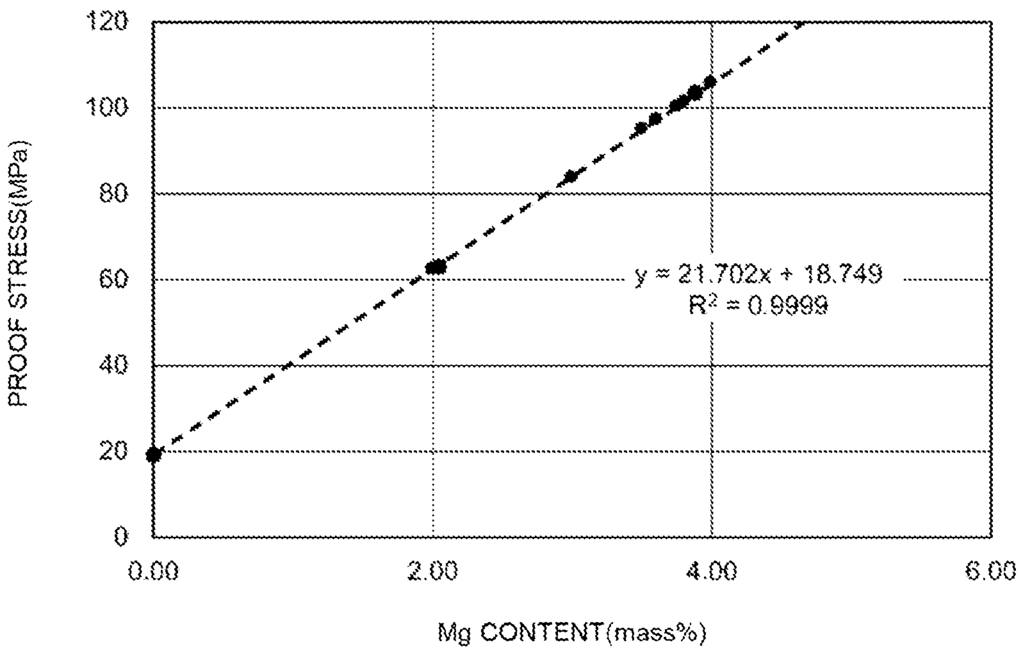
FIG. 4 is a graph showing a relationship between the Mg content and a proof stress of the aluminum alloy disc blank for a magnetic disc.

FIG. 4 is a graph showing the relationship between the Mg content and the proof stress of the aluminum alloy disc blank, and it is found that, in the range of data shown in the graph, a relational expression "“proof stress”=21.702×“Mg content”+18.749" is satisfied. As a result, it is found from FIG. 4 that, when the Mg content becomes large, the proof stress becomes large.

The present disclosure makes it possible to provide an aluminum alloy disc blank for a magnetic disc having a predetermined alloy composition and a predetermined conductivity, whereby the formation of protruding defects is inhibited, the smoothness is enhanced and the proof stress is large.

The invention claimed is:

1. An aluminum alloy disc blank for a magnetic disc made of an aluminum alloy comprising Mg: 3.40 to 3.90 mass %, Si: 0.016 mass % or more and 0.060 mass % or less, Fe: 0.020 mass % or more and 0.060 mass % or less, Zn: 0.30 mass % or less, and Cr: less than 0.10 mass % with a balance being Al and inevitable impurities, wherein a conductivity of the aluminum alloy disc blank for a magnetic disc is 36.0% IACS or higher, wherein the aluminum alloy disc blank for a magnetic disc has a proof stress 90 mPa or more.

2. The aluminum alloy disc blank for a magnetic disc according to claim 1, wherein the aluminum alloy comprises Mg: 3.40 to 3.65 mass %.

3. The aluminum alloy disc blank for a magnetic disc according to claim 1, wherein the aluminum alloy comprises Mg: 3.40 to 3.55 mass %.

4. The aluminum alloy disc blank for a magnetic disc according to claim 1, wherein the aluminum alloy further comprises one or two or more elements selected from the group consisting of Cu: 0.30 mass % or less, Be: 0.0020 mass % or less, Sr: 0.10 mass % or less, Na: 0.10 mass % or less and P: 0.10 mass % or less.

5. A magnetic disc, comprising, on a surface of an aluminum alloy substrate made of the aluminum alloy disc blank for a magnetic disc according to claim 1, a Ni—P plated layer and a magnetic body layer on the Ni—P plated layer.

6. The aluminum alloy disc blank for a magnetic disc according to claim 1, wherein the Cr is present at 0.05 mass % or less.

7. The aluminum alloy disc blank for a magnetic disc according to claim 1, wherein the aluminum alloy further has Fe+Mn at 0.026 mass % or less.

* * * * *